(12) United States Patent
Anderson et al.

(10) Patent No.: US 7,027,516 B2
(45) Date of Patent: Apr. 11, 2006

(54) METHOD AND APPARATUS FOR SPLICING

(75) Inventors: Roger Anderson, Sundsvall (SE); Lars Farm, Sundsvall (SE)

(73) Assignee: Pinnacle Systems, Inc., Moutain View, CA (US)

( * ) Notice: Subject to any disclaimer, the term of this patent is extended or adjusted under 35 U.S.C. 154(b) by 737 days.

(21) Appl. No.: 09/752,150

(22) Filed: Dec. 29, 2000

(65) Prior Publication Data

US 2002/0041628 A1    Apr. 11, 2002

Related U.S. Application Data

(63) Continuation of application No. PCT/SE99/01177, filed on Jun. 29, 1999.

(51) Int. Cl.
*H04B 1/66* (2006.01)

(52) U.S. Cl. .......................... 375/240.26; 375/240.28; 375/240; 370/487; 370/490; 370/498; 370/389; 348/705

(58) Field of Classification Search ........... 375/240.26, 375/240.28, 240; 370/400, 498, 487, 490, 370/389; 386/109; 348/705
See application file for complete search history.

(56) References Cited

U.S. PATENT DOCUMENTS

| | | | |
|---|---|---|---|
| 4,646,287 A | * | 2/1987 | Larson et al. ............... 370/400 |
| 5,917,830 A | * | 6/1999 | Chen et al. ................. 370/487 |
| 6,038,000 A | * | 3/2000 | Hurst, Jr. ............... 375/240.26 |
| 6,101,195 A | * | 8/2000 | Lyons et al. ................. 370/498 |
| 6,137,834 A | * | 10/2000 | Wine et al. .................. 375/240 |
| 6,151,443 A | * | 11/2000 | Gable et al. ................ 386/109 |
| 6,252,873 B1 | * | 6/2001 | Vines .......................... 370/389 |
| 6,414,998 B1 | * | 7/2002 | Yoshinari et al. ....... 375/240.25 |

FOREIGN PATENT DOCUMENTS

| | | |
|---|---|---|
| EP | 0 837 609 | 4/1998 |
| WO | WO97/45965 | 12/1997 |
| WO | WO99/14955 | 3/1999 |
| WO | WO99/52067 | 10/1999 |

* cited by examiner

*Primary Examiner*—Shawn S. An
(74) *Attorney, Agent, or Firm*—Peter J. Gordon; Schneck & Schneck

(57) ABSTRACT

A method and apparatus for splicing programs in the MPEG domain, wherein program data is carried in MPEG transport streams (TS) of data packets. The data packets carry application data, e.g. video and audio data, and a header provided with control data. According to the invention control data objects are established for each data packet for storing time references and data packet status information. The control data objects are queued in different queues dependent on the data packet status or on the status of a group of data packets. Control data objects associated to data packets to be output in an output stream of data packets are selected from the queues, whereupon selected control objects are assembled to a program of associated data packets of different kinds of data. Finally, data packets associated to said selected and assembled control data objects are assembled to an output stream of data packets.

4 Claims, 2 Drawing Sheets

METHOD AND APPARATUS FOR SPLICING

This is a continuation of International Application Serial No. PCT/SE99/01177, filed Jun. 29, 1999, the entire disclosure of which is incorporated herein by reference.

TECHNICAL FIELD

The present invention relates generally to processing of digital image data, and in particular to a method and a system for concatenating or splicing streams of digital data comprising image data compressed in accordance with MPEG as well as other data.

BACKGROUND

Digital compression technology has brought considerable benefits in terms of bandwidth savings and the potential for improved image quality when telecommunicating or telecasting. The advantages, however, are balanced with drawbacks in the shape of operational complexity. A simple video manipulation such as a cut between two sources is considerably more complex in the MPEG domain than with uncompressed analogue data due i.a. to an interdependence between data in an MPEG encoded data stream.

A state of the art solution in the broadcasting industry is to convert from compressed to uncompressed data for presentation and manipulation, then to switch back again to compressed data for onward transmission. This is, however, comparatively costly and has a severe impact on video quality. Consequently, until the problem is solved in a more satisfactory manner, the broadcasting industry and consumer networks will have no option but to remain analogue and many opportunities for new digital services will be stalled.

The problem of splicing has so far been intimately coupled to data compressed according to the MPEG standard (MPEG=Moving Pictures Expert Group). This standard for generic encoding i.e. compression, of moving image data is described in the *International Standard ISO/IEC* 13818-1, *first edition* 1996–04-15, and *ISO/IEC* 13818-2, *first edition* 1996–05-15, which are herewith incorporated by reference for their teachings of the MPEG standards and definitions within this technical field. These documents define the framework of encoding data within what is called the MPEG domain.

In this context a splice is the term within MPEG for the process of connecting the end of a first MPEG stream to the beginning of a second MPEG stream in order to create a stream that may be decoded with a minimum of artifacts at the splice point. Typically, splicing is performed on programs carried in MPEG Transport streams (TS). A program can be described as a set of data streams such as video, audio and related data that share a common time base characterized by a Program Clock Reference (PCR). In fact, the MPEG standards define a complex syntax containing a mixture of data and control information. Many parameters of an MPEG bit stream must be checked or managed to achieve a splice which is undetectable when viewed on a display, This is known as a "seamless" splice. Another definition is that a seamless splice results in an unbroken sequence of video frames.

If not all the relevant MPEG parameters can be controlled, it may still be possible to splice in such a manner that the only display artefact is a brief freeze frame. This is called a "non-seamless" splice. If splicing rules are not observed the MPEG standard will be violated resulting in unpredictable performance by a decoder. Distracting and highly noticeable artefacts may occur, which can continue for an extended period while image data buffers are flushed of undecodable data and the decoder re-synchronises. Other problems faced when splicing according to prior art is quality loss due to alterations of the information in the video layer or due to adjustment of DCT quantization or such manipulation The transmission of data in the MPEG domain is divided into access units. For video the access unit is called a picture, representing a certain period of presentation. In MPEG-2, which is one of the MPEG standards, the three different video picture types are called I, P and B pictures, respectively. The I means that an I picture is intra-coded, which in turn means that all the information needed to decode such a picture is contained in the I picture. Contrarily, a P picture is predictive-coded, meaning that it contains data about picture changes in relation to a preceding reference picture. Such a preceding reference picture can be an I picture or a P picture. B pictures are bi-directionally coded pictures also containing change data. The B pictures, however, can be encoded with prediction from both preceding and succeeding pictures. For audio the data is arranged in access units called frames, which can be said to correspond to the pictures in the video stream. Audio is considerably easier to handle than video since the sizes of audio frames do not tend to vary as much, and since all frames are separately decodable (compare with an I picture).

A problem connected to the processing of compressed video streams; and especially splicing programs comprising video, is that, unlike uncompressed video, picture boundaries in the bitstream are not evenly spaced. Transmission of P and B pictures often take only a fraction of the time for transmission of I pictures. Synchronising picture boundaries to splice two streams is a problem that must be solved dynamically at the time of the splice. Furthermore, since not all pictures are independently decodable (as an I picture) not all picture boundaries can be taken as candidates for a splice point. Designers of splicers and architects of digital television systems must take this into consideration. Most prior art describing video splicing operations assume that the delay through a splicer is constant for each bit stream and that the splicer output rate is equal to the input rate.

To further appreciate why seamless splicing is not easy to achieve, it should be understood that:

Several programs can be transmitted in one transport stream (TS), and specific data, i.e. video, audio, subtitling, etc, relating to each program is transmitted serially in said transport stream;

Frames of data of a certain kind, i.e. video, audio, etc, associated to the same program are generally neither transmitted in the transport stream in the order nor at the rate they are intended to be presented;

Frames of data of the same kind, especially video picture frames associated to one programs vary in size (bits) from one frame to another;

The structures of different layers in a transport stream are not coupled in a single way;

Bit streams of data in two programs subjected to splicing do generally not relate to the same time base.

One way of achieving seamless splicing has been presented in *Proposed SMPTE Standard for Television, Splice Points for MPEG-2 Transport Streams*, which is herewith incorporated by reference for its description of the SMPTE splicing method. Further background information about splicing in general and the SMPTE splicing standard proposal is found in the publications *MPEG Splicing, Tutorial and Proposed SMPTE Standard* and *Splicing FAO, Frequently Asked Questions about MPEG Slicing and the*

*SMPTE Slicing Standard* by Norm Hurst and Katie Cornog, which are herewith incorporated by reference for the descriptions of the problem area of splicing. One aspect of he SMPTE proposal is to put constraints on the decoding delay times of video elementary streams (VES), so that the delay time for leaving one VES matches the decoding delay time for entering another VES. In practice, this entails a reduction in bit rate or a restriction in the GOP structure near the splice points, which in turn results in decreased video coding efficiency and a system layer overhead. Another aspect is that information on when the delay time matching can be achieved, so called in-points and out-points for entering and leaving a VES, has to be indicated in the associated transport packets. One drawback with this technique is that the required pre-processing of program material is costly, and another drawback is the fact that practically all existing program material already encoded into the MPEG domain will be impossible to splice. A further drawback is that existing encoders and multiplexers cannot be used with pre-processed material, and have to be replaced. The two functions video encoding and multiplexing cannot be independent since they have to agree on where and when the splice points should be inserted in the different layers of the transport streams.

Another prior art approach to perform splicing is described in the publication *MPEG Splicing and Bandwidth Management, C. H. Birch, International Broadcasting Convention.* Sep. 12–16, 1997, Conference Publication No. 447, IEE 1997, which herewith is incorporated by reference. The disclosed approach is to lean against one of the constraints, e.g. rate of delivery of video data at the output of a splicer and treat the video stream in the splicer as Variable Bit Rate (VBR) material. The technique requires that the splicer have access to decode time stamps (DTS) and knowledge of the size of the associated coded pictures. With this information the splicer can regulate the rate of delivery of video data to a decoder so that its buffer will not overflow but ensuring that sufficient coded data is delivered to avoid a buffer underflow. To be effective this technique requires the availability of extra bandwidth to assign to the video data. While a multiplex with a single video program may have some unused bandwidth (null packets, pre-emptable non-real time data), the technique is likely to be most successful in multi-video program multiplexes. An advantage of this technique is that the same hardware can be programmed as a bandwidth-adapting multiplexer for statistical multiplexing of pre-encoded bit streams.

The U.S. Pat. No. 5,534,944 to Egawa et al discloses a method of splicing MPEG encoded video. This piece of prior art teaches a variety of buffer control wherein it is determined an amount of null information to be inserted between the two video signals in order to ensure that an input buffer of an MPEG decoder does not overflow after receiving the spliced video signal. The data stream is manipulated and it is probable that there are more or less visible artefacts in the picture as a consequence of the information insertion.

The European patent application EP 0 837 609 A2 shows a system for splicing compressed packetized digital video streams, and the international patent application with the publication number WO 97/45965 shows a method and an apparatus for splicing compressed information streams.

OBJECT OF THE INVENTION

It is a general object of the present invention to solve the problem of achieving seamless splicing. Further objects of the present invention is to solve the following aspects of the problem:

achieving seamless splicing without demanding that incoming transport streams (TS) have to be prepared in order to enable or facilitate seamless splicing;

eliminating the constraint of having to perform seamless splicing at predetermined times explicitly signalled in the transport stream;

adjusting in time the in-point time of a second, new program, so that it matches the out-point time of a first, old program;

arranging so that each I-frame in a video elementary stream (VES) can be used as an in-point, meaning that the group of pictures (GOP) immediately after the in-point I-frame is de-codable without reference to the preceding GOP;

eliminating the possibility of buffer violations regarding underflow and overflow in the receiving decoder buffers, as a result of the splicing operation;

realising a seamless splicer without the need of excessive computer resources;

eliminating the dependence on a program clock reference (PCR) carried by each program identifying element (PID);

switching from a first program for which the program clock reference (PCR) is associated with a first program identification number (PID), to a second program for which the PCR is associated with another PID;

achieving splicing without affecting the data content of any programs;

achieving seamless splicing between programs when the programs are not encoded with one frame per packetized elementary stream (PES) packet and where the programs do not have decoding time-stamps (DTS) in every PES header.

SUMMARY

According to the present invention the above mentioned object is achieved by a method and a system for splicing as defined in the accompanying claims. More specifically, editing of data is done at the transport level. To achieve this, all layers of the transport stream TS, including transport packets, packetized elementary streams (PES) layer and elementary layer, are monitored in a non-destructive way within the original multiplex. This gives sufficient knowledge of the contents of the TS to perform splicing. The PES layer is monitored with its clocks, a number of time parameters and buffers are monitored and the splicing process is controlled such that no buffer violations occur. More specifically, the invention comprises a method and an apparatus for splicing programs in the MPEG domain, wherein program data is carried in MPEG transport streams (TS) of data packets. The data packets carry application data, e.g. video and audio data, and a header provided with control data. According to the invention control data objects are established for each data packet for storing time references and data packet status information. Control data objects are also established on a higher level for ordered sets of said control data objects for storing information pertaining to different logical structures such as frames, sequences of frames and packetized elementary stream (PES) packets. The control data objects are queued in different queues dependent on the data packet status or on the status of a group of data packets.

Control data objects associated to data packets to be output in an output stream of data packets are selected from the queues, whereupon selected control data objects are assembled to a program of associated data packets of different kinds of data. Finally, data packets associated to said selected and assembled control data objects are assembled to an output stream of data packets. In other words, instead of manipulating real data and thus taking the risk of introducing artefacts into the data streams, a kind of meta data is created by means of control data objects. The control data objects can in their turn be manipulated and experimented with until in-points and out-points are found and a satisfactory splice can be arranged. The control data objects are queued in the order selected for the splice and in the output stage pointers from control data objects are used to pick out correct transport stream data packets and output a correctly spliced stream of data.

Advantages

Splicing according to the invention has inter alia the following advantages over prior art. The cuts are truly seamless, i.e. no gaps or discontinuities are introduced in the transmitted sequence of frames. The first picture in the new stream is displayed immediately following the last picture in the old stream. No black frames or other forms of inserted non-program material appear in the edited stream. The video layer remains unaltered and there is no quality loss at cut points or elsewhere. The invention further avoids introduction of discontinuities in clocks.

Cuts between spliced material are near frame accurate and accumulated program delay does in fact stay within half a GOP (¼s). In practical terms this means that the length of the inserted material will be exact and the splice will be frame accurate as long as the inserted stream is a complete stream where all frames are to be inserted. This is for example the usual case for local advertisement insertion.

Another advantage is that the splicing according to the invention is carried out without destroying the original multiplex as simpler methods do. That is, there is no need to unpack to elementary streams, splice and then re-multiplex.

Furthermore, an embodiment of the invention works with unmodified Digital Video Broadcast/MPEG2 constant bit rate transport streams currently produced by industry standard encoders and multiplexers. There are no special requirements on upstream or downstream equipment as is the case for both simpler and more complex methods. No need to force upstream encoders and multiplexers to waste bandwidth for special stream properties or other special treatment of the a transport stream. As long as there is space in the transport stream for the inserted material, the invention enables the splicing of different bit rate programs into each other.

The invention manages splicing without SMPTE splice points. However, embodiments of the invention are capable to utilize the stream properties enforced by SMPTE splice points, but will work just as well without. In fact the invention does not distinguish streams with SMPTE splice points from normal streams, since the former streams are just a subset of all MPEG-2 compliant transport stream. The invention requires less computing capacity than prior art methods since it requires no knowledge about data in the compressed domain and it does not change any picture data. For this reason, i.e. the picture data remains unaltered, the splicing in accordance with the invention does not impair the video quality.

Definitions

Terms and expressions used in this text are, apart from explanations in the text, either found in the publications referred to above or in the list of definitions found in the accompanying Appendix A.

BRIEF DESCRIPTION OF DRAWINGS

The invention will now be further explained by means of exemplifying embodiments and with reference to the accompanying drawings, wherein.

DETAILED DESCRIPTION OF EMBODIMENTS

The splicing method and system according to the invention, hereinafter also called the splicer referring to the method as well as to the apparatus, is intended to be used for seamless splicing of image data streams in the MPEG domain. The splicer receives as an input one or more source MPEG transport streams (TS), and delivers as an output one or more resulting MPEG transport streams.

In one embodiment of the invention the splicer is applied in a local network station. This local network would typically receive TS:s from different national broadcasters as well as local TS:s. There may also be a selectable input of TS:s from hardware in the network station.

The problem of splicing concerns the problem of interleaving one stream of data, i.e. video, audio, etc, in an MPEG transport stream (TS) with another stream of the same kind of data in the same TS or in another TS. Isolated bits of data strongly associated to each other constitute a frame. In the video case, for instance, the data needed to reproduce one picture is hence called a picture frame. As has been stated above, one characteristic of the MPEG system is that frames of data are not transported in a transport stream in the order to be presented on a display. Nor are the frames transported in the way they are to be presented. Furthermore the frame sizes tend to vary, both within a program and between programs, in streams of data of a certain kind. Another thing contributing to the difficulty of seamless splicing is that data streams referring to different programs relate to different time bases. Below, the general structure of the inventive method will be described followed by more detailed descriptions of different features of the invention.

Figure 1:
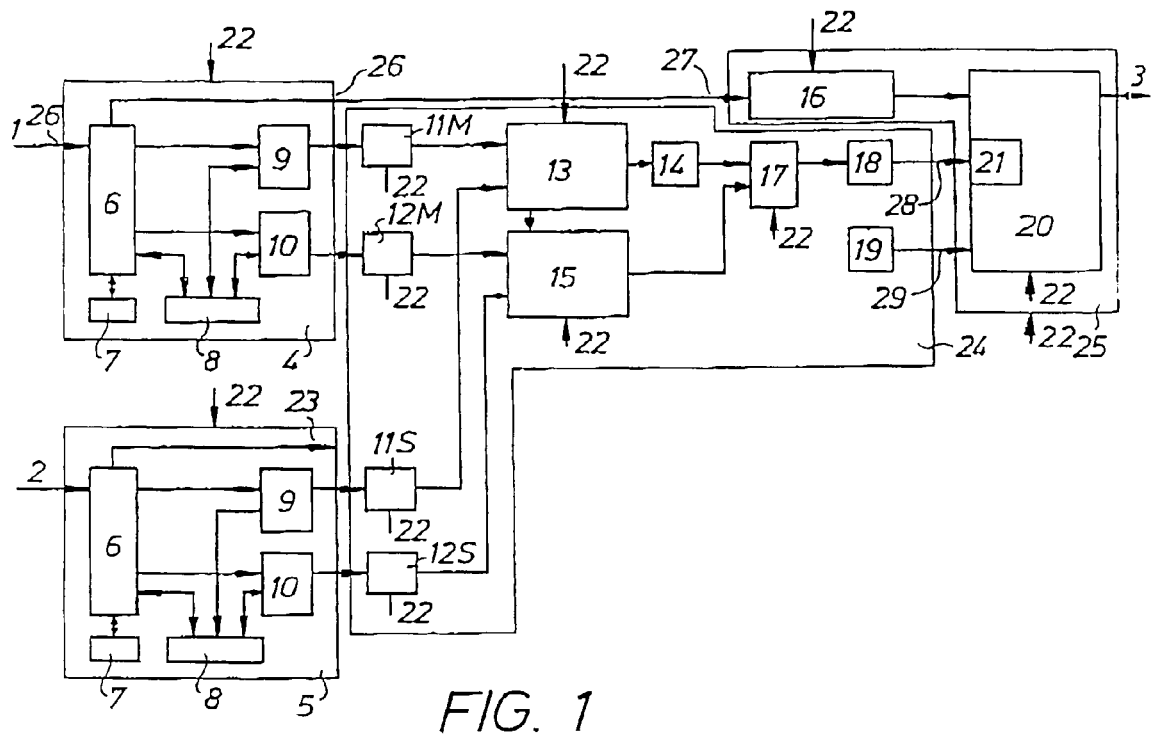
FIG. 1 shows a block diagram of an apparatus in accordance with the invention.

FIG. 1 shows a functional block diagram of all apparatus according to an embodiment of the invention. The block diagram also serves the purpose of showing the flow of events and actions taking place in the corresponding embodiment of the inventive method. The shown embodiment illustrates the situation where a first program comprised in a first transport stream (TS), in this embodiment called the master TS 1, is to be spliced with a second program comprised in a second transport stream, here called the slave TS 2. For simplicity the first program of the master TS is here called the master program and the second program of the slave TS is here called the slave program. Each of the first and second transport streams may comprise a single program or multiple programs, possibly together with other data carried in the transport stream. On a general level, the inventive apparatus comprises one decoder 4 and 5 for each of the master TS 1 and the slave TS 2, called master decoder 4 and slave decoder 5 respectively, for identification, decoding and extraction of program contents to be spliced, a splicer unit 24 for carrying out the splicing operation and an assembler unit 25 for assembling the spliced program with the main part of the Master TS. The internal structure of the inventive apparatus may be different in different embodiments and some components may operate in different parts. Each component is controllable and is provided with a control data input 22.

The master decoder 4 comprises a master TS input 6 for receiving the master transport stream 1, which first enters a transport stream parser, logger and distributor unit 6, in short called TS parser 6. The TS parser 6 is in its turn communicatively coupled to a program specific decoder 7 abbreviated "PSI decoder" 7, and a metal data directory 8 for storing preferably predetermined meta data used to create control data objects. The TS parser 6 is further coupled to a video processing device 9 and an audio processing device 10, the two latter of which are bi-directionally coupled to the meta data directory 8. The master decoder 4 is further provided with a control signal or control data input 22 for controlling the master decoder and its components and a main master TS output 26 for outputting the parts of the master TS that are not involved in the splicing possibly together with control data objects. The main master TS and the possibly attached control data objects are received by the assembler unit 25 which is further explained below. The slave decoder 5 comprises the same functional components as the master decoder 4, with a possible exception of the main slave TS output 23 for outputting the parts of the slave TS that are not involved in the splicing. In some applications and embodiments this main slave output is not present since those applications will not need the rest of the content of the slave TS and the corresponding data is simply wasted. In the case that a first program is to be spliced with a second program that is carried in the same transport stream, this transport stream is input to the master decoder as well as to the slave decoder.

The TS parser 6 is devised to analyse the syntactic function of data packets received in the input transport stream and to establish a control data object storing a time reference and data packet status information for each data packet. The data packets usually belong to ordered sets pertaining to different logical structures, such as frames, sequences of frames or packetized elementary stream packets (PES packets), and control data objects are also established for different such ordered sets. In the embodiment of FIG. 1, two such ordered sets are video information and audio information, which in their turn comprise further subgroups of ordered sets. After separate video processing and audio processing the subgroups of data packets and control data objects are output from the master decoder 4 and the slave decoder 5, respectively, to inputs of the splicer unit 24.

In the splicer unit 24, one or more subgroups from the video processing device 9 of the master decoder 4 are received in a master video subgroup queue 11M and one or more subgroups from the video processing device 9 of the slave decoder 5 are received in slave video subgroup queue 11S. One or more subgroups, here in the form of frames, from the audio processing device 10 of the master decoder 4 are received in a master audio subgroup queue 12M and one or more subgroups, here in the form of frames, from the slave decoder 5 are received in slave audio subgroup queue 12S, here also called frame queues. The video information subgroup queues 11M and 11S are coupled to a video splicer 13 devised to select from the queues control data objects associated to video data packets that are to be output in a stream of data packets constituting a result program. The video splicer is also communicatively coupled to an audio splicer 15, which is coupled to the master audio subgroup queue 12M and the slave audio subgroup queue 12S. Similar to the video splicer, the audio splicer is devised to select from the audio subgroup queues control data objects associated to audio data packets for the video information of the result program. The video splicer 13 and the audio splicer 15 are also communicatively coupled for synchronization of selection and other operations. The TS parsers 6 and/or the splicers 13, 15 are also devised to find possible in-points and out-points in the between the data packets and to prepare the data packets for enabling in-points and/or out-points.

The video splicer 13 is coupled to a video buffering verifier control 14 called VBV buffer control, which is a device for controlling the variability of the data rate that occurs in a program resulting from the preceding process. The VBV buffer control 14 and the audio splicer 15 are coupled to a program assembler 17 wherein selected control data objects are assembled to a result program of associated data packets of the different kinds of data, viz. video data and audio data. By means of the assembled control data objects, an output stream of data packets is then assembled and output to a program queue 18 for buffering the result program.

The assembler unit 25 comprises a main master TS input 27 and a main delay queue 16 for buffering the main master TS, a result program input 28 coupled to the program queue 18 of the splicer unit 24 and a padding packet input 19 coupled to a padding packet generator 19 comprised in the splicer unit or even in the assembler unit itself. The result program input 28 is coupled to a leak buffer control 21 for eliminating the risk of overflow in buffers within the splicer unit. The assembler unit further comprises a stream assembler 20 devised to assemble an output transport stream 3 comprising the result program by utilizing the control data objects and selecting data packets from a main delay queue 16, the result program queue 18 and the padding packet generator and assembling the packets in accordance with control information generated in the process.

Below, different functions and method steps of the invention will be described with reference to FIG. 1.

Genlocking and Program Clock References

In order to be able to make a proper rescheduling of data packets in the stream assembler 20, the time references of the packets are genlocked to the clock of the input master TS. Today, a nob clock of a transport stream is typically paced at 27 MHz. Having selected a target program, which is a program in the master TS that is to be provided with a new content as a consequence of a splicing operation, the Program Clock Reference (PCR) of the target program is sampled and stored. Based on the samples, an arrival time of every TS packet in the incoming master TS is calculated by interpolation or extrapolation of the Program Clock Reference sample. This arrival time is called the local clock reference (LCR) and is associated with each transport stream packet and in a data structure preferably in the form of a control data object. The local clock references of the control data objects are thus carrying information about the temporal positions within a transport stream at which all its transport stream packets arrived at the TS parser.

Time Decoupling, Integrity and Efficiency

An embodiment of the invention comprises steps and means for supporting increased computation efficiency with preserved data integrity and time decoupling between the target program and the rest of the master transport stream. This is accomplished by separating TS packets that need their integrity, from TS packets that are less sensitive with regard to change of content or position in the master transport stream. The separation is carried out by detecting the packet identifier (PID) of the integrity needing TS packets, here called occupied_PID, and the less integrity needing TS packets, here called idle_PID, and marking the meta data or the control data objects for reach of the data packets as occupied or idle, respectively. The positions of all TS packets belonging to the set of packets having idle_PIDs are considered free to utilize when assembling the output stream, and the consequence is that the idle_PID packets are delayed in the output transport stream and thus bandwidth is relocated. The idle_PIDs typically comprise possibly occurring padding PIDs and the PIDs carrying the target program. It may also include PIDs for packets carrying programs that are or will be entirely removed from the master transport stream and for packets carrying private data which is not real-time critical, for example IP traffic. The idle marks declare the positions as free to reuse for packets from the target program or, during an insertion cycle, from the spliced program, regardless of their original content or timing. For TS packets having idle_PIDs the decoder pushes the idle marked, meta data structure onto the main delay queue. In the specific case that the idle packet is a null packet, another reference to it is stored in a separate meta data structure, which is pushed onto a specific queue for further meta data gathering and processing. At most one packet per switch between original program content and inserted program content and per elementary stream ES will have its content changed. That is, if it includes data from two access units (Cf. Appendix A) and only one of them should be used in the resulting stream. Such packets are split into two packets so that each packet, in its entirety, may be associated with the other packets of the respective access units. Another extra packet, for the purpose of carrying a packetized elementary stream header (PES-header), is also created at the switch point. Beyond this, the packets from the idle_PIDs are also left unchanged when it comes to the picture data. However, time stamps, temporal_reference, and vbv_delay fields are changed as appropriate.

The occupied mark declares the requirement of preserved data integrity, i.e. those packets will be output from the assembler unit unchanged and at exactly the same positions in the transport stream, i.e. having the same local clock references (LCRs), as they entered. For TS packets having occupied_PIDs, the Master decoder pushes a meta data structure onto the main delay queue. The meta data structure contains the LCR, the occupied mark and a reference to the TS packet itself. At the other end of the queue, the stream assembler pops the structure, recognizes the occupied mark and just transmits the TS packet referred to. Not a single bit of tie packet is altered, or moved from where it was originally stored within the transport stream and thereby a minimum amount of processing resources is allocated to the occupied_PID packets.

It is important to note that all packets of the target program, or at least their meta data, are processed and rescheduled whether an insertion is in effect or not. So the target program may start at an arbitrary delayed point, i.e time offset. Furthermore, this time offset and the delivery rate of the program does not have to be constant through the transport stream. They may vary for different portions of the target program since the mux-rate is also controlled in accordance with the invention at least to the extent that available bandwidth and T-STD buffer constraints will allow. The T-STD is a system target decoder having buffer constraint which have to be checked during editing operations in order to avoid buffer overflow when decoding the spliced program of the edited transport stream. The constant processing of meta data in the master transport stream enables what in the invention is called time decoupling.

The TS parsers of the decoders contribute to the efficiency by means of the way they are devised to work on the different syntactic layers in the transport streams according to one embodiment of the invention, a partial audio decoder is used for parsing of audio data. The search for where the audio five borders are located is then accomplished by reading only four bytes per frame, which is the audio access unit. In a further embodiment the Boyer-Moore string-search algorithm, or a similar algorithms, is implemented for locating start codes in video data, which renders it sufficient to read only every third byte of the elementary video data. Only a small selection of other relevent data, located near those start codes, is also read from the video data. Beyond this, relevant information is normally extracted from TS packet headers and from all PES-headers up to and including their decoding time stamps (DTSs).

Time Zone Alignment

The slave transport stream comprising the program to be inserted is assumed to have a proper internal synchronisation, clocked by a different time base than the master stream. According to the invention, the the base of the program to be inserted is translated to the same time base as the original target program without any program clock reference discontinuity. When switching between data contents of the master stream and the slave stream, one video frame from each stream, one from each time zone, are aligned at the switch point, in the decoding-time domain instead of in the transport-time domain. All other needed buffer controlling adjustments are left to be carried out in the transport-time domain. These steps provides the rest of the algorithms in inventive method with a common time base and reveals all the control variables needed, to perform a splice void of discontinuities. In this application this procedure is called time zone alignment. To carry out the time alignment in the decoding-time domain instead of in the transport-time domain is enabled as a consequence of the time decoupling previously described. The time zone alignment enables the buffer control functions of the invention (described below) to manage the different video decoding delays, i.e. the different decoder buffer occupancies, of the new and old video stream by rescheduling all transport packets before, during and after an insertion cycle.

When a switch decision is made, it is known which frame of the new result stream should be decoded at the decoding time of the replaced frame. To avoid a decoding discontinuity, or in other words to provide a consecutive sequence of decoding times, the first frame of the new stream inherits the decoding time stamp (DTS) from the first frame being replaced. According to the invention this is preferably implemented by providing the corresponding control data objects with the current DTS. The amount of time shift needed to accomplish the DTS inheritance is defined by a time zone difference parameter time_zone_diff, where time_zone_diff=DTS_master-DTS$_{13}$ slave. DTS_master is the decoding time stamp for the first replaced anchor frame and DTS_slave is the original decoding time stamp for the new replacement I-frame. All clocks, PTS/DTs and LCRs, of the slave stream are recalculated by adding the time_zone_diff to each of them. This operation ensures that the original relative timing, created by an upstream multiplexor of a slave stream decoder, will be maintained and the video delay intended by the slave stream encoder and multiplexor will be reflected in the same "time-zone" as the one used by the master stream encoder and multiplexor.

Figure 2:
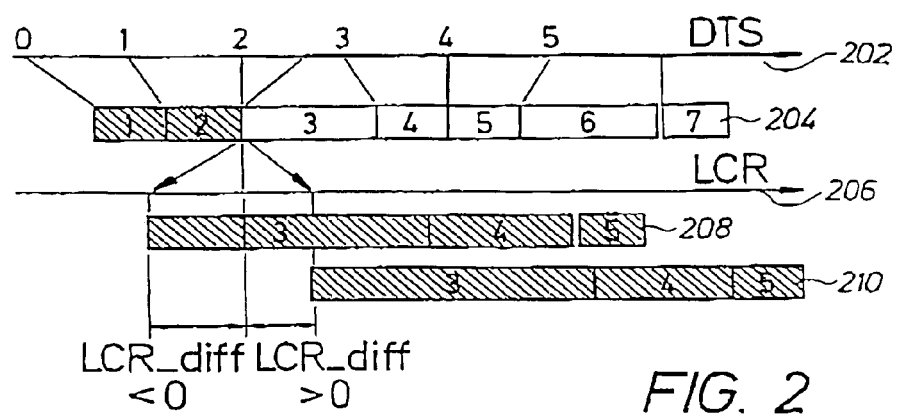
FIG. 2 shows a diagram illustrating time zone alignment according to an embodiment of the invention.

FIG. 2 shows two cases that may occur due to the different video delays or buffer occupancies of the master stream and the slave stream, respectively. The figure shows a switch point at decoding time stamp (DTS) position 2 in the decoding time domain illustrated by the time line 202. The frame sizes are illustrated by the widths of sections 1–7 in the old stream 204. The old stream 204 is also monitored in the transport time domain by means of the local clock reference illustrated by the lower time line 206. The new stream is monitored only in the transport time domain, i.e. with reference to the lower time line 206. The figure illustrates a first new stream 208 with an earlier local clock reference compared to the old stream thus overlapping and resulting in the parameter LCR_diff being assigned a value<0. Further, a second new stream 210 with a later local clock reference thus has a gap relative to the old stream and consequently the parameter LCR_diff is assigned a value>0. In accordance with the invention, the buffer control function (described below) operates on the value and the sign of the parameter LCR_diff.

Program Clock References (PCR)

The invention operates on one program within a transport stream that may contain several programs. A program typically consists of several sub-streams identified by a Program Identification number PID, each sub-stream containing an elementary audio- or video-stream or other data. The sub-streams of each program are given a common time base by Program Clock References PCR from which decoder timing is derived. One and only one PID may contain the PCR of a program. There is a Program Map Table PMT for each program in the transport stream and the PMT contains information about which PID carries the PCR. This fact entails a particular problem when splicing programs having different program clock references since the stream or program to insert may carry the PCR on the audio-PID and the program of the master stream may carry it on the video PID. Furthermore either or both streams may carry the PCR on a separate PID specifically for the PCR. Unless this is corrected and PCR treatment unified for the two streams this will confuse a down-stream decoder.

According to the invention the problem is solved by the following steps:

The program map table PMT is left intact, which means that whichever PCR-PID is specified for the master stream or the master program will also remain the PCR-PID during the insertion of the slave program into the master stream;

All PCR-timestamps are left in the packets by the TS decoder/parser of the input stage and the information follows the packet through the inventive process and apparatus regardless of PID;

The final stage of the device, i.e. the stream assembler, is given information about which PID should carry the PCR, i.e. the PCR PID for the output stream;

Every packet in every PID of the program is inspected in the assembler stage;

The original PCR's that are in the proper PID are re-stamped with a new correct PCR. This value is taken from the LCR of the main stream for the packet that the current packet will replace or is computed if needed;

All other PCR's are moved, regardless of PID;

New PCR's are inserted if a certain predetermined interval has passed since the last PCR on the PCR PID, e.g. by inserting a packet having only an adaptation field that contains the PCR. This is a kind of fall-back-mechanism that will supply PCR's if the PCR is on the wrong PID during an insertion. It can also be used to enforce a minimum PCR interval as required by MPEG (100 ms) or as recommended by DVB (40 ms).

Leaving and Entering a Data Stream

Leaving and entering data streams in a way that enables seamless splices requires suitable in-points and out-points in the master stream as well as in the slave streams. A suitable out-point is characterized in that the last pictures before the out-point constitutes a complete sub-group of pictures, i.e. each picture in the sub-group should be decodable independently of succeeding pictures. A suitable in-point is in its turn characterized by belonging to a group of pictures (GOP) that is decodable independently of any preceding pictures. Such a GOP is called a closed GOP. The present invention comprises a functionality that detects and/or creates such in-points and out-points, e.g. by achieving closed GOPs when needed. In accordance with the invention an out-point is selected by selecting a suitable out-group, which is the last group to send in the stream to be left. The property of the out-subgroup is that bi-directionally coded pictures are decodable by means of the information of the pictures within the selected sub-group. The property of a suitable in-sub-group is that it must begin with an I-picture, since the tail of the last picture or picture from the old stream must be aligned with the start of a suitable I-picture from the new stream. Such an I-picture is usually available within half a GOP and an in-subgroup is created according to the invention by eliminating the closest preceding B-pictures that have an earlier presentation time than the I-picture selected for the in-point. In order to align the in-point, i.e. the start of a selected I-picture is delayed or advanced by means of buffers comprised in the invention. Selection of one of two candidate I-pictures at which the master stream is re-entered is carried out dependent on a current program delay the time distance from a desired switch time to a presentation time stamp (PTS) of each candidate I-picture such that the accumulated variable program delay is minimised.

Buffer Control

A requirement on the resulting transport stream is that it should never violates the rules stated in the T-STD (Transport stream—System Target Decoder) model [MPEG2 Systems 2.4.2, P 8] In accordance with the invention buffer violations in the decoder is controlled by using free bandwidth in the form of empty packets in the master transport stream comprising the program to the wholly or partially replaced. The empty packets are used to re-schedule transport packets in said transport stream and there avoiding or disallowing overflow or underflow in the decoder buffers.

The Stream Assembler

The stream assembler utilises the idle marked positions for packets of the spliced program. All references to idle_PID packets as well as to occupied PID packets, their LCRs and the idle or occupied status marks are stored in control data objects that are routed through the main delay queue to the stream assembler. A copy of the reference to idle_PID packets is by means of another control data object routed a more complicated route, together with other vital meta data extracted from the different syntax layers of the packet. This meta data is gathered updated and stored by the different components of the invention as needed on its way through the decoders, splicers, the program assembler and the program queue. Two of the queues buffering meta data in control data objects, i.e. the main delay queue and the program queue, meet at the inputs of the stream assembler, which also has access to an unlimited supply of padding packets (PID=0x1FFF) from the padding packet generator.

The LCRs of idle_PIDs are change in different algorithms of the invention, e.g. in connection with time zone alignment, GOP closure, buffer control and variable program delay. The modified LCRs, affected by the different algorithms above, are used by the stream assembler to determine when to output the TS packets carrying the spliced target program. In an embodiment of the invention the stream assembler pops an item from the main delay queue, examines the idle/occupied mark and if marked occupied the TS packet referenced by the popped item is dispatched in the output stream. If marked idle it is deleted and replaced by a padding packet or by a packet from the spliced program queue. The LCRs of a current program item from the program queue and the idle marked item are compared. If the program LCR is equal or later than the main LCR, then the the TS packet associated with the program item is dispatched in the output stream. If the LCR for the current program TS packet is to small, a padding packet is transmitted instead, to fill the void. The process is repeated by popping the next item from the main queue and so on.

The Video Splicer

Subgroups (SGs) of control data objects and data packets the master and slave streams are queued before the video splicer in the subgroup queues. Their front items are popped into the video splicer for examination, one from the idle stream and one from the busy stream.

A stream that is busy, i.e. the stream currently being forwarded to the stream assembler, is outputted trough a Variable length Program Delay (VD) Queue. If the idle stream is dynamic, it may be the master or the slave, then the front idle subgroups are popped, and pushed through its VPD Queue. Since idle SG and busy SG may contain a different number of frames, a time locking mechanism is provided for the case where both streams are dynamic. This locking mechanism make sure that idle SG and busy SG overlap each other sufficiently to be synchronised. This synchronisation is done in the decoding time domain if the slave is busy waiting for a switch_out or in the transport time domain if the slave is idle waiting for a switch_in. At the time when a switch is about to occur, i.e. a dynamic idle stream will become the busy one, its VPD Queue is inspected to find a suitable I-frame. On the other hand, If the idle stream is static, being a locally stored slave stream, then the first idle SG is queued for its turn to be popped and become a busy SG. In the case of an idle static slave stream, it is known in advance that the idle SG meets the requirements for a video In Point.

Transport Stream Struture

A transport stream (TS) has a complex structure which is described in the MPEG standard referenced in the background above, however a simplified and very short description follows below for the understanding of some of the features of the invention. At the elementary stream (ES) level a video-frame is a picture header followed by coded video data. The picture header tells among other things whether it is an I-, a P- or a B-frame. P- and B-frames depend on other frames, whereas I-frames are independent. Video frames may be of greatly varying size. There is also data not directly related to frames such as sequence-header; its extensions and information about Group Of Pictures (GOP) interleaved between video frames. A sequence of video frames with the ancillary data is a video elementary stream (VES). An audio elementary sequence (AES) has a similar but simpler structure. In audio, each frame is self-contained and there is no other data than frames. An audio same is also divided into a header and coded audio data. An ES is either an AES or a VES.

An ES is cut in pieces that are stored in a Packetized Elementary Stream (PES). No structural correlation between PES packets and frames is needed. A PES packet consists of a variable size header containing among other things timestamps (PTS and DTS) and a length field (PES_packet_length). The timestamps might be missing from some PES-packets and from some frames contained in PES packets. missing timestamps can be inferred from earlier timestamps. A fragment of the elementary stream follows the PES-header. This ES-fragment can contain pairs of more than one frame. A PES-packet can have fixed or variable length. The transport layer of one sub-stream (PID) of a transport stream is constructed by cutting the PES into small fixed size (188 bytes) transport packets. These transport packets also contain a variable sized header followed by the actual PBS data referred to as the payload.

Finally, transport packets from all the PIDs in the transport stream are interleaved into a multi-layer structure. The data received as an input in the inventive apparatus is the transport layer, but the switch must be done at the elementary layer. A transport packet may contain fragments from two frames of which only one should be sent. I.e. at a switch point between streams or when closing an open GOP. Merely switching between two sport packets would make the surrounding PES packets invalid. Their length would become wrong and the timestamps (PTD/DTS) would refer to the wrong frame. Furthermore, a frame might have implicit DTS that can no longer be correctly inferred.

Parser

The video and audio processing blocks of the invention inspect all three layers and extracts relevant information from each layer. This information is stored in a separate data-structure, a control data object, outside the transport packets. All packets are left intact and unaltered, The transport packets that belong to a frame are stored together with associated information. For instance picture_coding_type (I-, P-, or B-picture) from the picture header as well as PTS and DTS from the PES header. Timestamps are computed and stored if not already present. Other relevant information is also stored in the separate data structure, for example a reference to the transport packet that contains a potential cut-point i.e. a frame border and where in that packet the border is and the frame size. This arrangement allows the splicing apparatus according to the invention to operate on a high level of abstraction. The rest of the apparatus can operate on a sequence of frames, and can mostly ignore transport packets even though all the transport stream data is still unaltered and located in transport packets.

For video the parser also stores and keeps track of some of the sequence-related data from the sequence header and its extensions, the GOP header if there is one and such data that may be of use for the splicing components. The packets carrying the sequence-related data are associated with the picture packets following it in the stream. There is also a reference to the packet and where in the packet the start-code for the first of sequence header, GOP or I-picture is so that a clean cut can be performed.

ES frames and PES-packets are structurally unrelated so in parallel the parser maintains another data-structure. All transport packets that belong to a PES-packet are grouped together in a separate structure that can be navigated sequentially back or forth starting at any packet, for instance the packet that contains the frame-border.

Video differs from audio in another respect. The video-splicing component does not operate on video frames, but rather on groups of video frames. An I- or P-picture (anchor-picture) followed by a number of B-pictures is called an anchor-group or a sub-group. The parser collects pictures into anchor groups. An anchor-group is then treated as a unit in its own right. This queue of groups is thereafter presented as an input to the video-splicing component.

Scanning the elementary streams for start-codes is preferably done by using different algorithms for AES and VES. For audio a partial MPEG audio frame-header-decoder is provided in one embodiment for computing where the next frame should start. At that point a linear search for the MEG audio frame-start-bit-pattern begins. Unless there is ancillary data after the audio frame, that is where the next frame will start and the search will succeed immediately. Only four ES-bytes per audio-frame must be inspected. As mentioned above, for video elementary data a variation of the well-known Boyer-Moore string search algorithm can be used to find relevant start codes. This reduces the number of bytes that must be inspected from the entire VES to about a third. All ES-information that the splicing device needs can be found near start-codes.

PES Clean Cuts

When the sequence of frames or anchor-groups must be broken, i.e. a switch between sequences or closing an open GOP, special care is taken to properly maintain the above mentioned control data-structures and ensure that the resulting sequence of transport packets comply with the MPEG specification. For instance, the PES packets are altered so that they are correct on both sides of the cut. PES timestamps are provided for a possibly new PES packet. The transport packet that contains the cut-point is split in two. This in one embodiment done in the following manner:

Starting from the data structure holding a frame it is navigated through the structure to find both the transport packet where the cut is to be and the corresponding PES. The following steps are carried out:

Separate frame-B

Insert a new transport packet after the cut packet, copy the fraction containing frame-B data to the new packet. Pad via a transport packet adaptation field as needed.

Insert a transport packet between the cut packet and the new packet containing a new valid PES header with timestamps. This makes frame-B PES-clean at the cut end.

Clean up frame-A

Find the PES header and compute a new PBS_packet_length. This makes the old PES packet shorter, but complete.

If the old PES contains PTS/DTS that refers to the next frame, the timestamps are removed.

Slide the data relating to frame-A down to the end of the cut transport packet, add padding through an adaptation field as needed.

This makes frame-A PES-clean at its cut end.

These PES-cleaning operations are provided by the structure holding a frame and serves other parts of the invention. The command to make any frame PES-clean can be ordered by any component of the apparatus and at any stage of the inventive process. The PES cleaning performable on every frame or only on a minimum, for example at the actual cut-points, as desired.

The GOP Closure Algorithm

Figure 3:
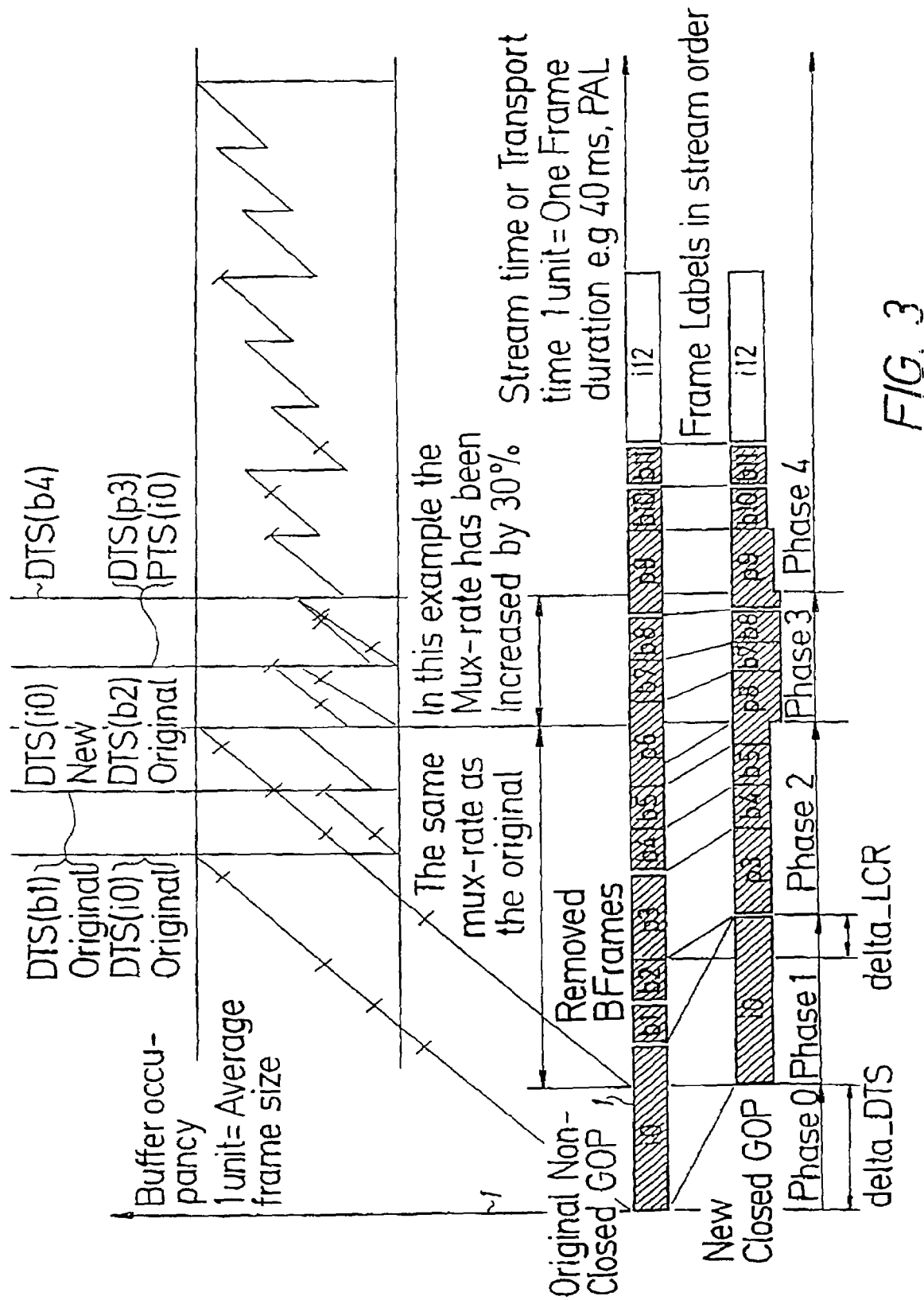
FIG. 3 shows a diagram illustrating a GOP closure algorithm according to one embodiment of the invention.

The GOP Closure algorithm is facilitated by the time decoupling feature of the invention. It renders the possibility to use any I-frame as an entry point into a stream, even if it does not belong to an originally closed GOP. The steps of the GOP closure algorithm is explained with reference to FIG. 3. The algorithm comprises the following steps or phases;

Phase 0: The unwanted B-frames are identified and deleted. (b1 and b2)

Phase 1: The decoding time of the I-frame, DTS(i0), is postponed by the number of deleted B-frames times the frame_duration. Or put in other terms, DTS(i0) is increased by: delta_DTS=[PTS(i0)−frame_duration]−DTS(i0). All TS packets belonging to the I-frame are rescheduled, by increasing their LCRs by delta_DTS.

Phase 2: The next TS packet to be scheduled is the first packet of the P-frame p3 in the next SG. This packet will now most probably have an earlier LCR than the last packet of the rescheduled I-frame. The reason for this is that B-frames are normally transported faster than their duration, because they are normally smaller than the average frame size.

This difference, delta_LCR, is calculated and added to the LCR of all the following TS packets, until their recalculated value reaches the new DTS(i 0), calculated in Phase 1. This step is provided to ensure that the video buffer is not filled up above the level at which the upstream encoder/multiplexor originally expected the I-frame to be decoded. The delta_LCR will always be less than delta_DTS, as long as B-frames are smaller than the average frame size. So those TS packets, following the I-frame until the decoding time of the same I-frame, are scheduled later an they were originally, but not by as much as the I-frame.

Phase 3: Now the I-frame has been extracted from the buffer leaving plenty of room for new video bytes. The danger of buffer overflow is gone, but an underflow is much more likely. Especially because the next frame to be extracted is the P-frame p3 which is presumably bigger than B-frames that the encoder expected would help to fill the buffer up, by draining it less. The GOP Closure algorithm will therefore try to increase the mux-rate as much as possible, in order to rapidly raise the buffer level and prevent the expected undertow situation. The LCR of the TS packet to be scheduled next will at this point be delta_LCR and ticks behind, because it has not yet received any treatment like the packets in Phase 2 has received. However, the same treatment is posed, i.e. it will get a value LCR_Phase 3 bigger than DTS(i0). The LCRs of the following packets is assigned this LCR_Phase 3 value as long as its original LCR value is less than LCR_Phase 3 which is enough to keep them from competing with the Phase 2 packets. Phase 4: GOP Closure is completed and the other algorithms of the invention can now use the closed GOP property.

The invention method is according to different embodiments implemented as hardware further comprising a central processing unit, a data storage device and input/output interfaces. One embodiment is implemented as a computer program having means, recorded on a recording medium, for performing each of the steps of the inventive method and each of the functions of the functional components.

Appendix A access unit A coded representation of presentation unit. In the case of audio, an access unit is the coded representation of an audio frame.

In the case of video, an access unit includes all the coded data for a picture, and any stuffing that follows it, up to but not including the start of the next access unit. If a picture is not preceded by a group_start_code or a sequence_header_code, the access unit begins with the picture_start_code. If a picture is preceded by a group_start_code and/or sequence_header_code, the access unit begins with the first byte of the first of these start codes. If it is the last picture preceding a sequence_end_code in the bitstream, all bytes between the last byte of the coded picture and the sequence_end_code (including the sequence_end_code) belong to the access unit.

AES Audio Elementary Stream, Audio ES.

Anchor frame I- or P-frame constituting the base in a SG. An anchor frame of a SG will always have the earliest DTS, but the latest PTS, of all frames in the SG.

backward prediction Prediction from the future reference frame (field).

Bitrate The rate at which the compressed bitstream is delivered from the channel to the input of a decoder.

bitstream; stream An ordered series of bits that forms the coded representation of the data.

B-picture; Bidirectionally predictive-coded picture Bidirectionally predictive-coded picture A picture that is coded using motion compensated prediction from past and/or future reference fields or frames.

Busy stream The stream currently forwarded to the Stream Assembler.

busySG The SG currently in focus belonging to the Busy stream.

coded B-frame A B-frame picture or a pair of B-field pictures.

coded frame A coded frame is a coded I-frame, a coded P-frame or a coded B-frame.

Coded I-frame An I-frame picture or a pair of field pictures, where the first field picture is an I-picture and the second field picture is an I-pictures or a P-picture.

Coded order The order in which the pictures are transmitted and decoded. This order is not necessarily the same as the display order.

Coded P-frame A P-frame picture or a pair of P-field pictures.

Coded picture A coded picture is made of a picture header, the optional extensions immediately following it, and the following picture data. A coded picture may be coded frame or coded field.

Coded representation A data element as represented in its encoded form.

Constant bitrate Operation where the bitrate is constant from start to finish of the compressed bitstream.

Decoder An embodiment of a decoding process.

Decoder input buffer The First-In-First-Out (FIFO) buffer specified in the video buffering verifier.

Decoding time domain Time expressed using Decoding Time Stamps (DTS), where video frames have a constant duration, but transport packets carry a varible amount of presentation time.

Display order The order in which the decoded pictures are displayed. Normally this is the same order in which they were presented at the input of the encoder.

DTS; decoding time-stamp (system) A field that may be present in a PES packet header that indicates the time that an access unit is decoded in the system target decoder.

Dynamic stream A stream that is fed into the LSM in real-time, e.g. a national live broadcasted stream.

EB; Elementary stream Buffer One of the buffers that constitute the T-STD described in 2.4.2 of ISO/IEC 13818-1.

Editing The process by which one or more compressed bitstreams are manipulated to produce a new compressed bitstream. Edited bitstreams meet the same requirements as streams which are not edited.

Encoder An embodiment of an encoding process.

ES; elementary stream (system) A generic term for one of the coded video, coded audio or other coded bitstreams in PES packets. One elementary stream is carried in a sequence of PES packets with one and only one stream_id.

Forward prediction Prediction from the past reference frame (field).

frame (audio) A part of the audio signal that corresponds to PCM samples from an audio access unit.

frame (video) A frame contains lines of spatial information of a video signal. For progressive video, these lines contain samples starting from one time instant and continuing through successive lines to the bottom of the frame. For interlaced video, a frame consists of two fields, a top field and a bottom field. One of these fields will commence one field period later than the other.

frame period The reciprocal of the frame rate.

frame picture; frame structure picture A frame structure picture is a coded picture with picture_structure is equal to "Frame".

frame rate The rate at which frames are output from the decoding process.

frame re-ordering The process of re-ordering the reconstructed frames when the coded order is different from the display order. Frame re-ordering occurs when B-frames are present in a bitstream. There is no frame re-ordering when decoding low delay bitstreams.

Genlocking (TS genlocking?) Using the Master stream's PCRs as references for synchronising the LSM.

GOP closure A method that makes an open GOP closed.

group of pictures A notion defined only in ISO/IEC 1172-2 (MPEG-1 Video). In ITU-T Rec. H.262 I ISO/IEC 13818-2, a similar functionality can be achived by the mean of inserting group of pictures headers.

Header A block of data in the coded bitstream containing the coded representation of a number of data elements pertaining to coded data that follow the header in the bitstream.

Idle stream The stream waiting to become a Busy stream.

idle_PIDs PIDs in the Master stream which are free for the LSM to use.

IdleSG The SG currently in focus from the Idle stream.

I-field picture A field structure I-Picture.

I-frame picture A frame structure I-Picture.

intra coding Coding of a macroblock or picture that uses information only from that macroblock or picture.

I-picture; intra-coded picture A picture coded using information only from itself.

Item Metadata structure accompanying every TS packet.

layer (video and systems) One of the levels in the data hierarchy of the video and system specifications defined in Parts 1 and 2 of ITU-T Rec. H.222.0 I ISO/IEC 13818-1.

LCR; Local Clock Reference The time in the Master streams Transport time domain that is calculated and recommended by the Video Splicer to be used by the Stream Assembler in order to make a proper rescheduling.

LCR_diff The time difference, after locking on a certain frame, between the Master streams and the Slave streams decoding times.

LSM; Limit Splicing Method Overarching name for the buildingblocks, techniques, methods and algorithms that constitute the splicing system.

Main Delay Queue The queue through which all Items travel.

Master stream The stream used to genlock the system. It is also the stream, which will be inserted with new material.

MB; Multiplexing Buffer One of the buffers that constitute the T-STD described in 2.4.2 of ISO/IEC 13818-1.

MPTS; Multiple Program TS A Transport Stream carring more than one program.

MSG The SubGroup of the master stream currently in focus.

New stream The stream that becomes the Busy stream after a switch.

Occupied_PIDs PIDs in the Master Stream which are never changed by the LSM.

Old stream The stream that becomes the Idle stream after a switch.

Payload Payload refers to the bytes which follow the header bytes in a packet. For example, the payload of some Transport Stream packets includes a PES packet header and its PES packet data bytes, or pointer field and PSI sections, or private data; but a PES packet payload consists of only PES packet data bytes. The Transport Stream packet header and adaptation field are not payload.

PCR; Program Clock Reference (system) A time stamp in the Transport Stream from which decoder timing is derived.

PES (system) An abbreviation for Packetized Elementary Stream

PES packet (system) The data structure used to carry elementary stream data. A PES packet consists of a PES packet header followed by a number of contiguous bytes from an elementary data stream. It is a layer in the system coding syntax described in 2.4.3.6 of ITU-T Rec H.222.0 I ISO/IEC 13818-1.

PES packet header (system) The leading fields in a PES packet up to and not including the PES packet data byte fields, where the stream is not a padding stream. In the case of padding stream the PES packet header is similarly defined as the leading fields in a PES packet up to and not including padding byte fields.

PES Stream (system) A PES Stream consists of PES packets, all of whose payloads consist of data from a single elementary stream, and all of which have the same stream_id. Specific semantic constraints apply. Refer to Intro. 4 of ITU-T Rec. H.222.0 I ISO/IEC 13818-1.

P-field picture A field structure P-Picture.

P-frame picture A frame structure P-Picture.

Picture Source, coded or reconstructed image data. A source or reconstructed picture consists of three rectangular matrices of 8-bit numbers representing the luminance and two chrominance signals. A "coded picture" is defined in 3.21 of ITU-T Rec. H.262 I ISO/IEC 13818-2. For progressive video, a picture is identical to a frame, while for interlaced video, a picture can refer to a frame, or the top field or the botttom field of the frame depending on the context.

Picture data In the VBV operations, picture data is defined as all the bits of the coded picture, all the header(s) and user data immediately preceding it if any (including any stuffing between them) and all the stuffing following it, up to (but not including) the next start code, except in the case where the next start code is an end of sequence code, in which case it is included in the picture data.

PID; packet identifer (system) A unique integer value used to identify elementary streams of a program in a single or multi-program Transport Stream as decribed in 2.4.3 of ITU-T Rec. H.222.0 I ISO/IEC 13818-1.

P-picture; predictive-coded picture A picture that is coded using motion compensated prediction from the past reference fields or frame.

Prediction The use of a predictor to provide an estimate of the sample value or data element currently being decoded.

Prediction error The difference between the actual value of a sample or data element and its predictor.

Presentation time domain Time expressed using Presentation Time Stamps (PTS), where video frames have a constant duration, but transport packets carry a varible amount of presentation time.

Program (system) A program is a collection of program elements. Program elements may be elementary streams. Program elements need not have any defined time base; those that to, have a common time base and are intended for synchronised presentation.

Program Delay The delay that the Spliced program experiences through the LSM compared to if the program had not gone through the LSM.

Program element (system) A generic term for one of the elementary streams or other data streams that may be included in a program.

PSI; Program Specific Information (system) PSI consists of normative data which is necessary for the demultiplexing of Transport Streams and the successful regeneration of programs and is described in 2.4.4 of ITU-T Rec. H.222.0 I ISO/IEC 13818-1. An example of privately defined PSI data is the non-mandatory network information table.

PTS(busySG) The PTS of the anchor frame in the BusySG.

PTS; presentation time-stamp (system) A field that may be present in a PES packet header that indicates the time that a presentation unit is presented in the system target decoder.

PTS_switch The scheduled time of a switch expressed in the Presentation time domain as a PTS.

re-ordering delay A delay in the decoding process that is caused by frame re-ordering.

SG; SubGroup A collection of one anchor frame and all of the, in stream order, following B-frames. If there are any before the next anchor frame. A SG is in most cases considered to be non-divisible. One of the possible exceptions is the special case when B-frames should be eliminated, because of their prediction from a previous anchor frame which will be cut out and never reach the output stream.

Slave stream The stream carrying the material to be inserted into the Master Stream.

Slice A consecutive series of macroblocks which are all located in the same horizontal row of macroblocks.

Spliced program The Target program after it has gone through the LSM regardless of if the Target program's content has been replaced or not.

Splicing (system) The concatenation, performed on the system level, of two different elementary streams. The resulting system stream conforms totally to ITU-T Rec. H.222.0 I ISO/IEC 13818-1. The splice may result in discontinuities in timebase, continunity counter, PSI, and decoding.

SPTS; Single Program TS A Transport Stream carrying only one program.

SSG The SubGroup of the slave stream currently in focus.

start codes (system and video) 32-bit codes embedded in that coded bitstream that are unique. They are used for several purposes including identifying some of the structures in the coding syntax.

start codes (system) 32-bit codes embedded in the coded bitstream. They are used for several purposes including identifying some of the layers in the coding syntax. Start codes consists of a 24-bit prefix (0x000001) and an 8-bit stream_id as shown in Table 2-18 of ITU-T Rec. H.222.0 I ISO/IEC 13818-1.

Static stream A stream that is fed into the LSM on request e.g. stored locally on disk.

STD; system target decoder (system) A hypothetical reference model of a decoding process used to define the semantics of an ITU-T Rec. H.222.0 I ISO/IEC 13818-1 multiplexed bitstream.

Stream assembler The building block in the LSM responsible for fitting the Spliced program into the Master stream.

Switch An event that takes place at a certain SG, completely replacing the busySG with the idleSG and changing idle/busy state between the two.

Switch_in Switching from Master stream to Slave stream.

Switch_out Switching from Slave stream to Master stream.

Target program The program in the Master stream that is possibly subject to insertion of new content.

TB; Transport Buffer One of the buffers that constitute the T-STD described in 2.4.2 of ISO/IEC 13818-1.

Time base A 27 MHz System Time Clock (STC) which is common to a program. Also popularly referred to as a time-zone.

Time Base De-coupling Making the Spliced programs Time base independent on all other Time bases.

time_zone_diff The time difference between the Master stream's and Slave streams Time bases.

time-stamp (system) A term that indicates the time of a specific action such as the arrival of a byte or the presentation of a Presentation Unit.

Transport Stream packet header (system) The leading fields in a Transport Stream packet, up to and including the continuity_counter field.

Transport time domain Time expressed using STC or Program Clock Reference (PCR) ticks, where each transport packet has a fixed transmission time, but video frames have variable transmission time.

TS; Transport Stream The Transport Stream is a stream definition which is tailored for communicating or storing one or more programs of coded data according to ISO/IEX 13818-2 and SO/IEC 13818-3 and other data in environments in which significant errors may occur. It is defined in ISO/IEC 13818-1.

T-STD A system target decoder (STD) for Transport Streams, described in 2.4.2 of ISO/IEC 13818-1.

TZA; Time Zone Alignment Mapping the Slave stream's Time base onto the Master stream's Time base.

Varible bitrate (system) An attribute of Transport Streams or Program Streams wherein the rate or arrival of bytes at the input to a decoder varies with time.

Varible bitrate (video) Operation where the bitrate varies with time during the decoding of a coded bitstream.

VBV; video buffering verifier A hypothetical decoder that is conceptually connected to the output of the encoder. Its purpose is to provide a constraint on the variability of the data rate that an encoder or editing process may produce.

VES Video Elementary Stream, Video ES.

video sequence The highest syntactic structure of coded video bitstream. It contains a series of one or more coded frames.

Video Splicer The heart of the LSM. Is, by external control, in charge of all the decisions about how, where, and when to do the splicing.

VPD; Variable Program Delay; VPD Varying the Program delay to provide switch time alignment between the Idle stream and the Busy stream.

*Definition gathered inter alia from ISO/IEC 13818-1, 13818-2

The invention claimed is:

1. A method for splicing data streams of MPEG-compressed programs, the program data being carried in MPEG transport streams of data packets having program clock references referring to an MPEG encoder system clock, the data packets carrying application data, such as video and audio data, and a header provided with control data, the method comprising:

receiving a first input transport stream of first data packets;

receiving a second input transport stream of second data packets to replace selected first data packets in said first stream;

extracting for each data packet a time reference and data packet status information indicating the syntactic function of the data packet;

establishing for each data packet a control data object storing said time reference and said data packet status information;

establishing for ordered sets of said first data packets corresponding ordered sets of control data objects;

establishing for said ordered sets of control data objects other control data objects storing information pertaining to different logical structures, such as frames, sequences of frames and packetized elementary stream packets;

queuing the control data objects in different queues dependent on the data packet status or on the status of a group of data packets;

selecting from the queues control data objects associated to data packets to be output in an output stream of data packets;

assembling selected control data objects to a program of associated data packets of different kinds of data;

assembling data packets associated to said selected and assembled control data objects to an output stream of data packets;

outputting said assembled stream of data packets;

wherein video pictures comprised in the transport streams are arranged in groups-of-pictures such that each I-picture belongs to a group-of-pictures which does not depend on any previous pictures as reference for its decoding, called a closed group-of-pictures; further comprising the step of:

generating, for an intra-coded I-picture a closed group-of-pictures property by eliminating the unwanted B-pictures that have an earlier presentation time than said I-picture.

2. A method for splicing data streams of MPEG-compressed programs, the program data being carried in MPEG transport streams of data packets having program clock references referring to an MPEG encoder system clock, the data packets carrying application data, such as video and audio data, and a header provided with control data, the method comprising:

receiving a first input transport stream of first data packets;

receiving a second input transport stream of second data packets to replace selected first data packets in said first stream;

extracting for each data packet a time reference and data packet status information indicating the syntactic function of the data packet;

establishing for each data packet a control data object storing said time reference and said data packet status information;

establishing for ordered sets of said data packet corresponding ordered sets of control data objects;

establishing for said ordered sets of control data objects other control data objects storing information pertaining to different logical structures, such as frames, sequences of frames and packetized elementary stream packets;

queuing the control data objects in different queues dependent on the data packet status or on the status of a group of data packets;

selecting from the queues control data objects associated to data packets to be output in an output stream of data packets;

assembling selected control data objects to a program of associated data packets of different kinds of data;

assembling data packets associated to said selected and assembled control data objects to an output stream of data packets;

outputting said assembled stream of data packets;

selecting one of two candidate I-pictures at which the first input transport stream is re-entered dependent on a current program delay and the time distance from a desired switch time to a presentation time stamp of each candidate I-picture.

3. An apparatus for splicing data streams in MPEG-compressed program, the program data being carried in MPEG transport streams of data packet having program clock references referring to an MPEG encoder system clock, the data packets carrying application data, such as video and audio data and a header provided with control data, the apparatus comprising:

means for receiving a first import transports stream of first data packets;

means for receiving a second input transport stream of second data packets to replace selected first data packets in said first stream;

means for extracting for each data packet a time reference and data packet status information indicating the syntactic function of the data packet;

means for establishing for each data packet a control data object storing said time reference and said data packet status information;

means for establishing for ordered sets of said first data packets corresponding ordered sets of control data objects;

means for establishing for said ordered sets of control data objects other control data objects storing information pertaining to different logical structures of higher level than the data packets such as frames, sequences of frames and packetized elementary stream packets;

means for queuing the control data objects in different queues dependent on the data packet status or on the status of a group of data packets;

means for selecting from the queues control objects associated to data packets to be output in an output stream of data packets;

means for assembling selected control objects to a program of associated data packets of different kinds of data;

means for assembling data packets associated to said selected and assembled control data objects to an output stream of data packets;

means for outputting said assembled stream of data packets;

wherein video pictures comprised in the transport streams are arranged in groups-of-pictures such that each I-picture belongs to a group-of-pictures which does not depend on an previous pictures as reference for is decoding, called a closed group-of-pictures;

further comprising:

means for generating for an intra-coded I-picture, a closed group-of-pictures property by eliminating the unwanted B-pictures that have an earlier presentation on time than said I-picture.

4. An apparatus for splicing data streams in MPEG-compressed programs, the program data being carried in MPEG transport streams of data packet having program clock references referring to an MPEG encoder system clock, the data packets carrying application data, such as video and audio data, and a header provided with control data, the apparatus comprising:

means for receiving a first import transports stream of first data packets;

means for receiving a second input transport stream of second data packets to replace selected first data packets in said first stream;

means for extracting for each data packet a time reference and data packet status information indicating the syntactic function of the data packet;

means for establishing for each data packet a control data object storing said time reference and said data packet status information;

means for establishing for ordered sets of said first data packets corresponding ordered sets of control data objects;

means for establishing for said ordered sets of control data objects other control data objects storing information pertaining to different logical structures of higher level than the data packets such as frames, sequences of frames and packetized elementary stream packets;

means for queuing the control data objects in different queues dependent on the data packet status or on the status of a group of data packets;

means for selecting from the queues control objects associated to data packets to be output in an output stream of data packets;

means for assembling selected control objects to a program of associated data packets of different kinds of data;

means for assembling data packets associated to said selected and assembled control data objects to an output stream of data packets;

means for outputting said assembled stream of data packets;

means for selecting one of two candidate I-pictures at which the first input transport system is re-entered dependent on a current program delay and the time distance from a desired switch time to a presentation time stamp of each candidate I-picture.

* * * * *